United States Patent

Hartmann

[11] Patent Number: 5,958,244
[45] Date of Patent: Sep. 28, 1999

[54] CROSS-FLOW FILTERING PROCESS FOR SEPARATING FLUID FROM A FREE-FLOWING MEDIUM AND INSTALLATION FOR IMPLEMENTING IT

[75] Inventor: Eduard Hartmann, Schneisingen, Switzerland

[73] Assignee: Bucher-Guyer AG, Switzerland

[21] Appl. No.: 08/765,925

[22] PCT Filed: May 6, 1996

[86] PCT No.: PCT/CH96/00171

§ 371 Date: Jan. 16, 1997

§ 102(e) Date: Jan. 16, 1997

[87] PCT Pub. No.: WO96/36426

PCT Pub. Date: Nov. 21, 1996

[30] Foreign Application Priority Data

May 16, 1995 [CH] Switzerland ............... 1529/95

[51] Int. Cl.[6] ................................ B01D 61/00
[52] U.S. Cl. .................... 210/650; 210/636; 210/97; 210/257.2; 210/195.2; 210/96.2; 210/740; 210/741
[58] Field of Search .................... 210/650, 651, 210/652, 636, 97, 257.2, 195.2, 96.1, 96.2, 740, 741

[56] References Cited

U.S. PATENT DOCUMENTS

| | | | |
|---|---|---|---|
| 3,120,489 | 2/1964 | Hoch | 210/70 |
| 3,472,765 | 10/1969 | Budd et al. | 210/195.2 |
| 3,992,301 | 11/1976 | Shippey et al. | 210/140 |
| 4,069,155 | 1/1978 | Tsusimoto et al. | 210/195.2 |
| 5,112,489 | 5/1992 | Hartmann | 210/637 |
| 5,254,253 | 10/1993 | Behmann | 210/195.2 |
| 5,271,830 | 12/1993 | Faivre et al. | 210/151 |

FOREIGN PATENT DOCUMENTS

| | | |
|---|---|---|
| 8056394 | 6/1995 | Australia . |
| 433200 | 6/1991 | European Pat. Off. . |
| 2389400 | 12/1978 | France . |
| 2430451 | 2/1980 | France . |
| WO9515209 | 6/1995 | WIPO . |

*Primary Examiner*—Ana Fortuna
*Attorney, Agent, or Firm*—Burns, Doane, Swecker & Mathis

[57] ABSTRACT

For thickening a retentate by means of membrane filtration (ultra-/micro-filtration) to obtain the highest possible wet sludge proportion, a gaseous medium is admixed with the retentate. To this end an open feed line (13) above the retentate level (14), a porous ring (17) in the retentate, or a simple line connection (19, 20, 28, 29) in a tank (6) are proposed. A number of advantages accrue as a result of the lowering of the viscosity of the retentate achieved in this way, such as savings of energy for retentate recirculation, efficient installations because of longer series or passes of filtration modules, and savings in squeezing installations because of the direct filtration with high solid components.

13 Claims, 5 Drawing Sheets

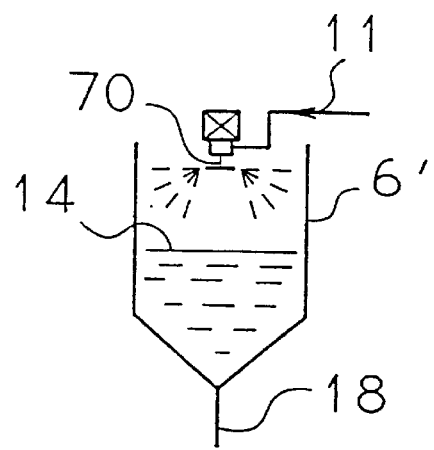
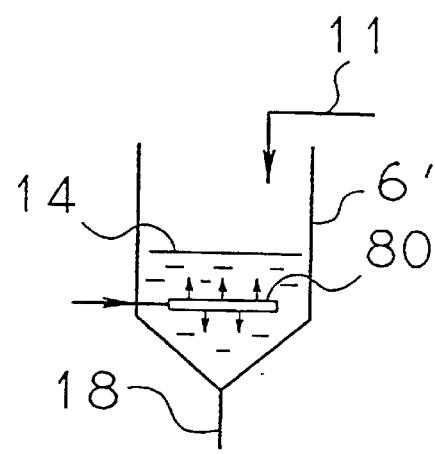
FIG. 7          FIG. 8
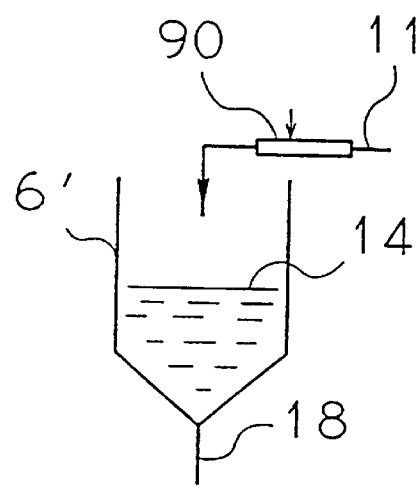
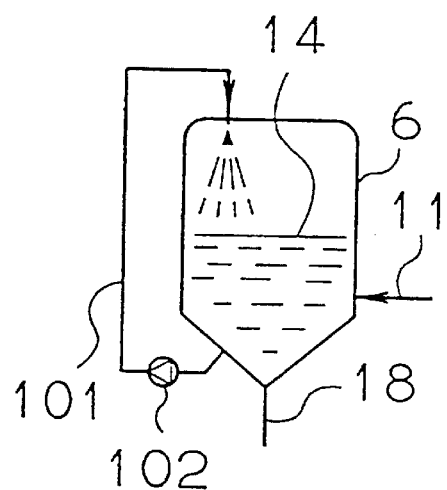
FIG. 9          FIG. 10

CROSS-FLOW FILTERING PROCESS FOR SEPARATING FLUID FROM A FREE-FLOWING MEDIUM AND INSTALLATION FOR IMPLEMENTING IT

FIELD OF THE INVENTION

The invention relates to a cross-flow filtration method for separating liquid from a flowable medium, wherein a material stream to be filtered contains parts to be separated and is moved in as a retentate through at least one module containing porous membranes and a filtrate is separated therefrom, as well as to an installation for performing the method.

BACKGROUND OF THE INVENTION

A method of this type is already known from EP-B1-0 427 099 (W. Müller). It achieves the purpose of obtaining a predetermined degree of thickening of the retentate in an operationally assured and simple manner. This micro-filtration method, in which the material stream to be filtered passes under pressure in a circuit through a micro-filtration module with membranes, over which the stream passes tangentially with continuous addition and removal of concentrate, operates by measuring the velocity and pressure drop in the retentate stream. The concentration of a turbid material is calculated from these measured values and the concentrate output is adjusted in case of deviations from a set value.

The aim in connection with such membrane filtrations in the form of ultra-filtration or micro-filtration is to thicken the retentate in the course of the thickening process to obtain the highest possible proportion of wet sludge. By means of this it is possible to reduce the costs for subsequent drying and disposal of the retentate. The degree of retentate thickening which can be achieved depends essentially on the highest viscosity at which the retentate can still be passed through the membrane modules of the installation used. To achieve high viscosity, it has been known up to now to keep at low levels the number of modules in each series (during each pass) and the velocity of the retentate over the membranes. However, a reduction of the number of modules per pass reduces the output of the installation and thus decreases it efficiency.

SUMMARY OF THE INVENTION

It is therefore the object of the invention to recite a method and an installation for the separation of liquids from a flowable medium, which make it possible to separate more liquids in comparison with known methods and in this way to obtain higher proportions of wet sludge in the retentate.

In accordance with the invention the object of the invention is attained by means of a method of the type mentioned at the outset by admixing a gaseous medium to the retentate. Various practical embodiments of this method ensue from the claims. Installations for the advantageous execution of the method in a filtration installation are also recited in the claims.

Tests with an installation in accordance with the invention have shown that it is possible to provide thickening of up to 90 to 95% parts of wet sludge by doubling the customary number of filtration modules per pass. With increased proportions of wet sludge, this is assumed to be the result of a reduction in the viscosity of the retentate because of the admixture of air. The novel method permits the employment of a larger number of filtration modules in series per pass and thus more efficient installations. Because of the larger proportions of wet sludge in the retentate there is an energy savings during final drying. In addition, the lowering of the viscosity of the retentate brings a reduction in the membrane wear. The mentioned advantages also occur during juice separation from fruit mash in membrane installations known per se, if the mash with all solid parts is directly filtered by means of the cross-flow method, while omitting the squeezing process.

BRIEF DESCRIPTION OF THE DRAWINGS

Exemplary embodiments of the invention are described in detail in the following description and the drawing figures. Shown are in.

DETAILED DESCRIPTION OF PREFERRED EMBODIMENTS

Figure 1:
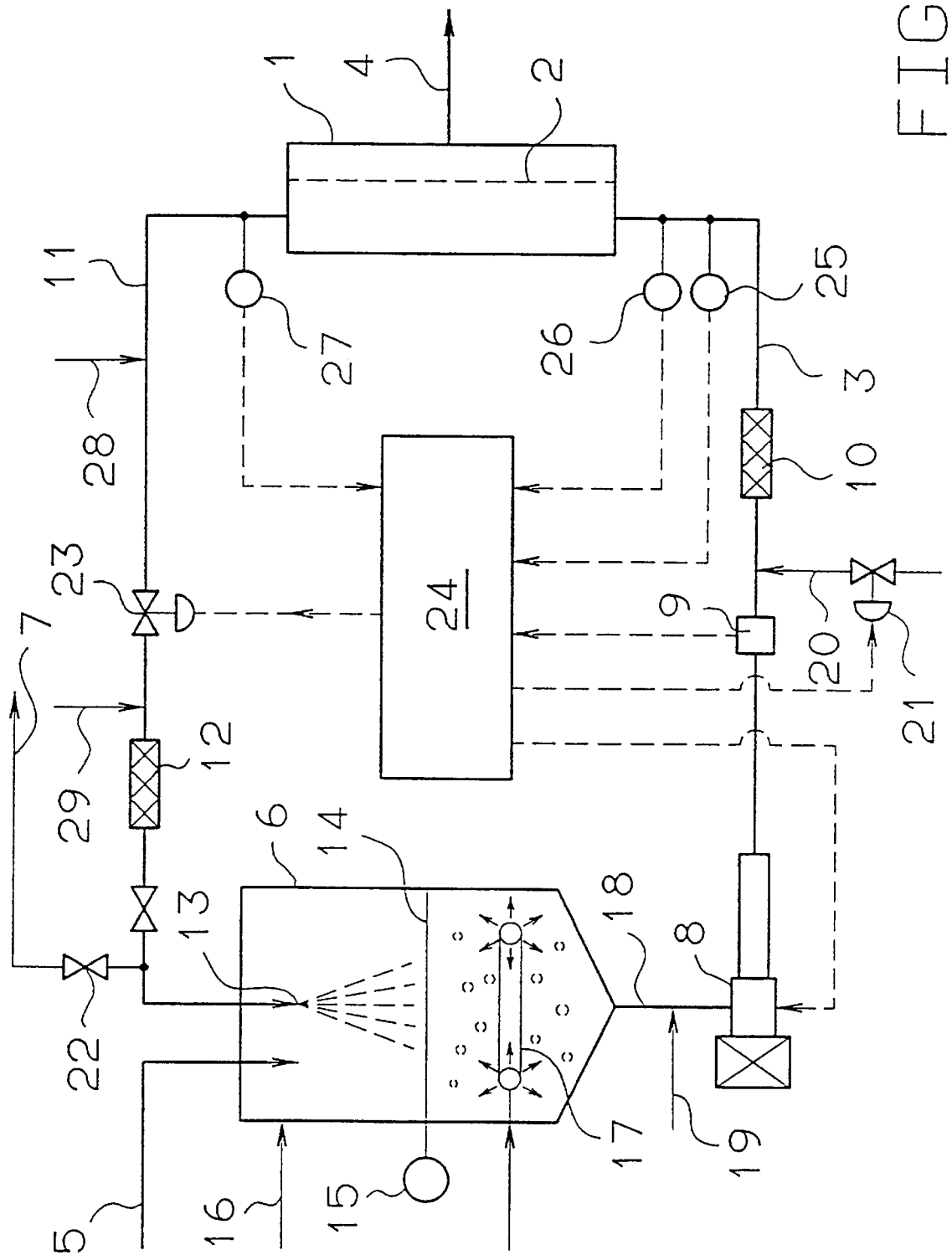
FIG. 1, a diagram of an installation in accordance with the invention for separating liquid from a medium, with different devices for admixing air with the medium.

FIG. 1 schematically represents a module 1 of a type known per se, having a porous membrane for separating a permeate from a retentate. The retentate comprises liquid and non-liquid portions, which are provided to the module 1 via a line 3. In accordance with the cross-flow method, the retentate flows across the surface of the membrane 2 in the module 1, wherein liquid portions move through its pores and are removed as permeate, as indicated by the arrow 4. Fruit mash from which the juice is to be separated, as well as waste water sludge which is to be dewatered, are known as important examples of use, but also fruit juices, which are intended to be clarified. Such known filtration installations comprise a multitude of such modules 1, which are simultaneously arranged parallel as well as in series in so-called passes in order to increase the filtration output and to reduce the proportion of remaining liquid in the retentate.

As shown by FIG. 1, the retentate has been guided in a retentate circuit through the line 3 and the module 1. The retentate enters this retentate circuit as a flowable medium via a feed line 5 and a batch tank 6. In so-called batch operation, the batch tank 6 is filled with a charge or "batch" of the medium to be separated and the batch is retained in the retentate circuit during the subsequent filtering operation until a desired degree of dewatering or wet sludge proportion has been achieved. Only then is the retentate removed from the circuit via a line 7 and a throttle 22, in the course of which a rinsing liquid for cleaning the retentate circuit is introduced through the feed line 5.

From the batch tank 6 the retentate reaches in a manner known per se the line 3 and the module 1 by way of a controlled conveying pump 8, a flow meter 9 and a static mixer 10. All volumetrically conveying pumps, which are known to operate by means of cells, wobble shafts, gear teeth or pistons, are suitable as conveying pumps 8. From the direction of the module 1 the retentate again reaches the batch tank 6 through a further line 11 and a further mixer 12, and the retentate circuit is closed with this. A control stage 24 is provided in a manner known per se for regulating the flow in the retentate circuit. As a function of the measuring signals of the flow meter 9 it controls the pressure at the inlet of the module 1 by means of a servo valve 23, and the flow speed by means of the conveying pump 8. The control stage 24 further controls or regulates the process circuit as a function of the signals of a viscosity sensor 25 at the inlet of the module 1 and two pressure sensors 26, 27 at the inlet and at the outlet of the module 1. The mentioned values of flow speed, viscosity and pressure of the retentate change as a result of thickening and therefore require regulation.

Figure 2:
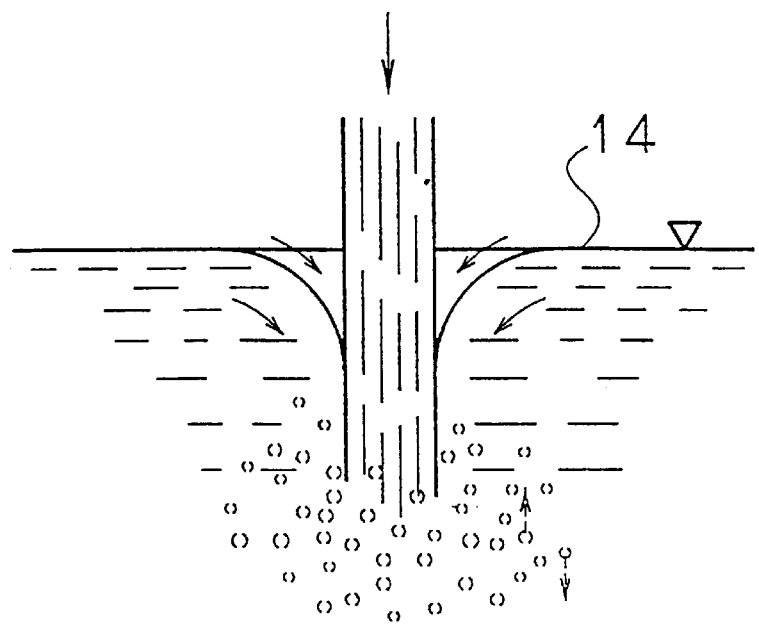
FIG. 2, the admixture of air with the surface of a retentate in a batch tank, FIG. 3, the admixture of air with the retentate in a line by means of a perforated pipe, FIG. 4, the admixture of air with the retentate from the permeate side of a filtration module in a series of modules placed downstream from each other, and FIGS. 5 to 13, devices for admixing gas to a medium in an installation in accordance with FIG. 1.

As shown by FIG. 1, various devices for admixing a gas, preferably air, to the retentate are provided for improving the conveyability of the retentate in the circuit. The return line 11 terminates at the batch tank 6 with an opening 13 at a defined height above the level 14 of the retentate. The retentate falls out of the opening 13 down to the level 14 and on striking the flow edge at a high speed entrains air or nitrogen from the tank 6 in the medium, as shown in detail in FIG. 2. A level sensor 15 for keeping the level 14 constant has been mounted on the tank 6 to assure a stable operation.

It has been shown that the admixture of gas during the free fall of the retentate in the batch tank 6 takes place particularly effectively if the diameter of the tank 6 is narrow and the height of the level 14 in the tank 6 is low. The rising speed of the gas bubbles introduced into the retentate is determined by their size and the viscosity of the retentate.

So that these gas bubbles reach the connecting line 18 between the batch tank 6 and the conveying pump 8, the flow speed of the retentate on the way down must be greater than the rising speed of the gas bubbles. In connection with the mentioned requirements for the tank diameter and the level height, a downward flow at increased flow speed forms in the retentate, which therefore effectively pulls the gas bubbles into the line 18. Accordingly, an open line in the lower zone of the tank 6 in the area of swift downward flow is sufficient for the introduction of air, perforated pipes etc. are not necessary.

As FIG. 1 shows, the batch tank 6 is embodied in a closed form. The composition of the gas atmosphere above the level 14 can be selected. It is determined by means of a feed 16 for fresh gas to replace the admixed gas. A porous ring 17 with an external gas supply is disposed in the retentate in the batch tank 6 below the surface level 14 as a further device for admixing gas. The gas can also be easily admixed in the connecting line 18 between the batch tank 6 and the conveying pump 8 via a line 19, or in the return line 11 via a line 28 or 29. A similar gas supply is provided between the flow meter 9 and the static mixer 10 via a line 20 and a valve 21 controlled by the control stage 24.

The simple admixture of gas via the lines 19, 20, 28, 29 makes the use of mixers 10 and 12 for homogenizing the retentate practical, in order to achieve a homogeneously reduced viscosity. Such mixers are unnecessary if a homogeneous distribution is already provided when admixing the gas to the retentate circuit, for example by the use of perforated lines, sintered lines, membranes or Venturi nozzles in the retentate line.

Figure 3:
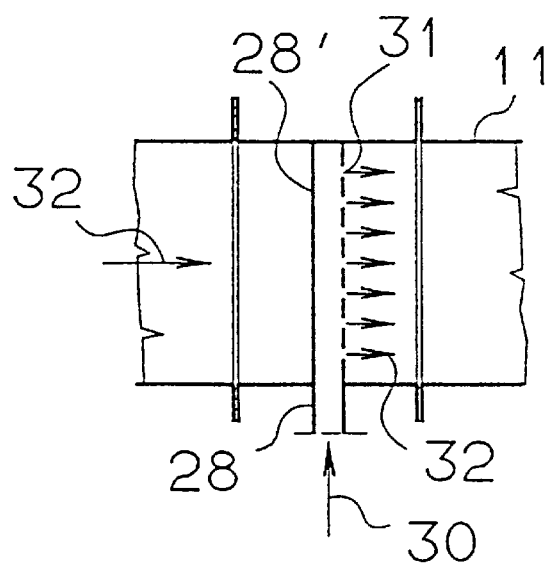

FIG. 3 shows by way of example the admixture of air 30 in the line 11 in accordance with FIG. 1 through the line 28, which is embodied as a perforated pipe 28' inside the line 11. The holes 31 are disposed in the pipe 28' on the side facing away from the retentate stream, as indicated by the arrows 32.

Figure 4:
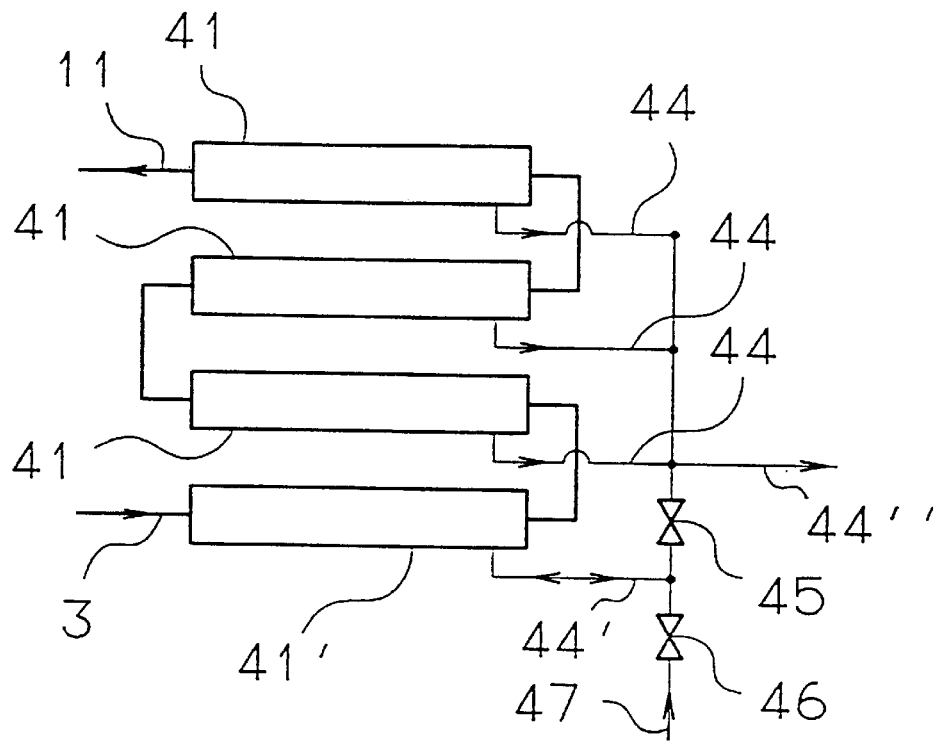

As already mentioned, industrial filtration installations comprise a plurality of filtration modules in series. Such a series of only four modules 41, 41' is shown in FIG. 4 by way of example. The series 41, 41' has been used in place of the module 1 in FIG. 1 between the feed line 3 and the return line 11 for the retentate. Each module 41, 41' has its own return line 44, 44' for the permeate, which are brought together in a permeate collection line 44". One of the modules, suitably the first one 41' of the series, can advantageously be used for admixing gas, which is introduced under pressure from the permeate side of the filtration membrane (2 in FIG. 1) through the line 44'. In this case the line 44' is separated from the permeate collection line 44" by means of two blocking valves 45, 46 and is connected with a gas supply 47, as shown in FIG. 4.

The gas supply can be shut off by means of the blocking valves 45, 46 and the module 41' can be operated in a normal filtering operation. Because of the fine and evenly distributed membrane openings, the admixture of gas to the retentate through the filtration membrane of a module 41' results in a particularly homogeneous gas distribution in the retentate.

Figure 5:
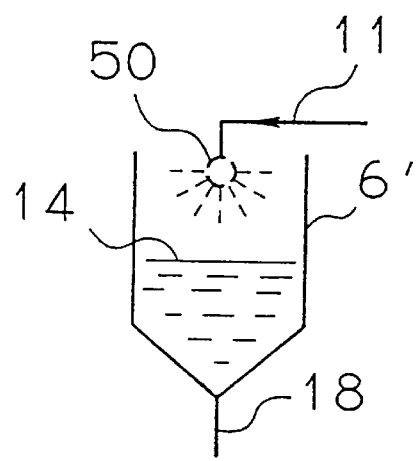

FIGS. 5 to 13 show variants of the devices for gas admixing in the batch tank 6 in accordance with FIG. 1. An open batch tank 6 is employed in the examples in accordance with FIGS. 5 to 9, so that ambient air is admixed as the gas. As shown by FIG. 5, the retentate return line 11 terminates in a spray head 50 above the retentate level 14 in the tank 6'. High speed is imparted to the partial retentate flows when they exit the spray head 50, in order to entrain a desired amount of air when striking the surface 14.

Figure 6:
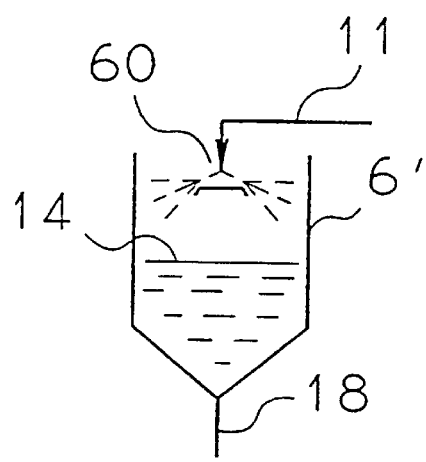

In accordance with the variant of FIG. 6, the spray head has been replaced by a deflector plate 60 at the outlet of the retentate line 11, and in accordance with FIG. 7 by an atomizer 70 with mechanically moved elements. In these examples the admixture of air to the retentate already takes place above the retentate level 14 and no high impact speed is attained here.

FIG. 8 shows a batch tank 6', in which a sintered plate 80 has been disposed below the retentate level 14 as the membrane for admixing air, similar to the porous ring 17 in FIG. 1. In the arrangement in accordance with FIG. 9, the retentate line 11 has a membrane 90 ahead of its end above the retentate level 14 in the tank 6', through which air is admixed under pressure. The membrane 90 can be arranged in a micro-filtration module or as a sintered pipe.

Figure 11:
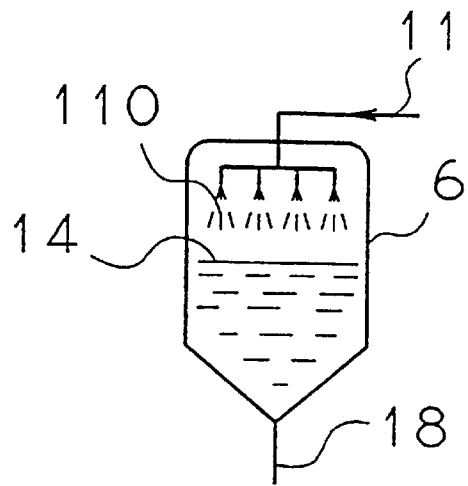
Figure 12:
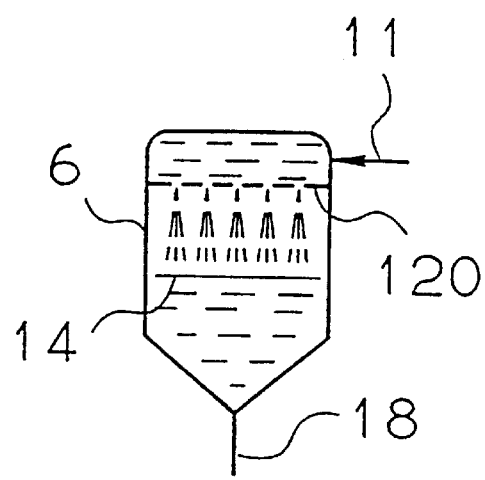
Figure 13:
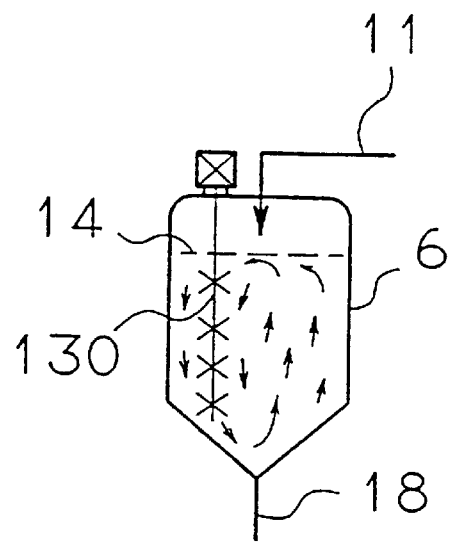

FIG. 10 shows a closed batch tank 6, which has its own retentate circuit 101 with a recirculating pump 102 for the introduction of gas above the retentate level 14. In this case the retentate return line 11 is connected with the retentate in the tank 6 below the level 14. FIG. 11 shows how the retentate is distributed from the return line 11 to a number of free line ends 110 even in a closed tank 6. The retentate exiting here absorbs the gas which is present above the surface 14 of the retentate. FIG. 12 shows an arrangement with an effect similar to FIG. 11, only here the retentate from the line 11 is introduced into the closed batch tank 6 above a perforated plate 120, which distributes it over the gas chamber located underneath it.

FIG. 13 again shows a closed batch tank 6 with a stirrer 130 disposed therein for high rpm operation. The stirring members of the stirrer 130 simultaneously pull the gas above the retentate level 14 down into the retentate and there distribute it evenly for further transport in the circuit via the line 18.

The gas admixture in accordance with the invention has further advantages besides the lowering of the viscosity of the retentate in accordance with the invention. In connection with liquefied fruit mash or squeezed fruit juice, it is known to oxidize phenols by means of air admixed in the tanks or by admixed oxygen 6 for improving the juice stability against later cloudiness. In the course of employing the method of the invention for these purposes, this effect appears in to a greater degree because of the admixture and distribution of suitable gases.

The filtration output in the modules 1 is furthermore improved because the reduction in viscosity advantageously affects the shear forces of the permeate stream at the membrane surfaces. Besides the increased degree of thickening of the retentate, the results also are energy savings because of reduced recirculating work for the less viscous retentate, a reduction in membrane wear and the option of employing more efficient filtration installations, because with less viscous retentates it is possible to operate a larger number of filtration modules in series.

Known squeezing methods in connection with fruit mash can be omitted, because this mash can now be directly filtered by means of the cross-flow method in spite of all the solids contained in it. If the admixture of air is sufficiently finely distributed, the retentate assumes an almost foam-like state. But an improvement is already achieved if the distribution is omitted and the gaseous medium is added to the retentate stream downstream of the recirculating pump simply in a series of timed interruptions.

I claim:

1. A cross-flow filtration method for thickening a solid-liquid mixture, comprising moving the mixture to be filtered in the form of retentate through at least one membrane module (1, 41) with porous membranes (2) to separate liquid filtrate therefrom through said membrane, and reducing the viscosity of said retentate to facilitate the movement thereof through said at least one membrane module by admixing a gaseous medium with the retentate, said gaseous medium being only admixed with the retentate if the viscosity of the retentate lies above a preset value.

2. The method in accordance with claim 1 carried out in a batch operation wherein the retentate is recycled in a circuit to a batch tank (6), and the gaseous medium is admixed to the retentate in the supply flow (3) to the membrane modules (1, 41).

3. The method in accordance with claim 2, wherein the gaseous medium is admixed with the retentate in the batch tank (6) in the course of its return into the batch tank (6) by impinging the retentate with the greatest possible speed on the surface (14) of the retentate already present in the tank (6).

4. The method in accordance with claim 2, wherein the flow speed in the retentate circuit is changed as a function of the average amount of the gaseous medium admixed with the retentate per unit of time.

5. The method in accordance with claim 4, wherein the flow speed is changed by the conveyed amount of retentate in such a way that the pressure drop in the retentate circuit over the membrane modules (1, 41) or the inlet pressure at the first module remain constant.

6. The method in accordance with claim 1, wherein the amount of the admixed gaseous medium is regulated as a function of the density or viscosity of the retentate or its pressure drop at said at least one membrane module.

7. The method in accordance with claim 1, wherein the retentate is supplied to the membrane modules (1, 41) by means of a pump (8) through a line (3), and that the gaseous medium is admixed with the retentate stream downstream of the pump (8) in such a way that gas bubbles of a size up to the diameter of the feed line (3) are created.

8. The method in accordance with claim 1, wherein the retentate is supplied to the membrane modules (1, 41) by means of a pump (8) through a line (3), and the gaseous medium is admixed with the retentate stream downstream of the pump (8) in a series of timed interruptions.

9. The method in accordance with claim 1, wherein the solid-liquid mixture to be filtered is passed through a series of modules (41, 41') arranged in series one behind another and having porous membranes, and gas is admixed with the retentate under overpressure from the filtrate side through the membrane in one of the first or the last module (41') of the series.

10. An installation for thickening a solid-liquid mixture to a high solids content, comprising at least one filtration module (1, 41) with porous membranes (2), over which a stream of the solid-liquid mixture to be filtered can be passed tangentially as the retentate by a conveying pump (8) and a feed line (3) to the filtration modules (1, 41), and a device (13, 17, 19, 20) for reducing the viscosity of said retentate to facilitate the movement thereof through said at least one filtration module by admixing a gaseous medium with the solid-liquid mixture to be filtered, wherein said device for admixing (20) comprises a gas supply line, in which a regulating element (21) for the amount of gas supplied is arranged, and wherein said regulating element (21) for the amount of the supplied gas is operatively connected with a device for measuring viscosity (25), pressure (26, 27) or flow-through (9) of the retentate.

11. The installation in accordance with claim 10, additionally comprising a homogenizer or a static or articulated mixer (10, 12) disposed downstream of the device for admixing (20, 29) in the line (3, 11) for the retentate.

12. The installation in accordance with claim 10, including a retentate circuit with a batch tank (6, 6') located in it for the mixture to be filtered, said retentate circuit having a return line (11) the end (13) of which is arranged in the batch tank (6, 6') above the retentate level (14) in such a way that the retentate from the return line (13) strikes the retentate level (14) directly.

13. The installation in accordance with claim 10, including a retentate circuit with a batch tank (6, 6') located in it for the mixture to be filtered, said retentate circuit having a return line (11) the end of which is arranged in the batch tank (6, 6') above the retentate level (14), and nozzles, spray heads (50), deflector plates (60), mechanically driven atomizers (70), multi-armed distributors (110) or perforated bottoms (120) inserted into the tank (6), are disposed at the outlet of the retentate line (11) for admixing the gas located above the retentate level (14) with the medium to be filtered.

* * * * *